US005627225A

United States Patent [19]
Gorbaty et al.

[11] Patent Number: 5,627,225
[45] Date of Patent: May 6, 1997

[54] ROAD PAVING BINDERS

[75] Inventors: Martin L. Gorbaty, Westfield, N.J.; Christian G. Lenoble, Bordeaux, France; Nicholas C. Nahas, Chatham; Dennis G. Peiffer, Annandale, both of N.J.

[73] Assignee: Exxon Research and Engineering Company, Florham Park, N.J.

[21] Appl. No.: 551,078

[22] Filed: Oct. 31, 1995

[51] Int. Cl.$^6$ ........................................... C08L 95/00
[52] U.S. Cl. .............................. 524/71; 524/59
[58] Field of Search ............................... 524/59, 71

[56] References Cited

U.S. PATENT DOCUMENTS

| | | | |
|---|---|---|---|
| 4,371,641 | 2/1983 | Boyer et al. | 524/71 |
| 4,460,723 | 7/1984 | Rollmann | 524/71 |
| 4,514,308 | 4/1985 | Clampitt et al. | 524/59 |
| 4,591,611 | 5/1986 | Jenkins et al. | 524/71 |
| 4,617,227 | 10/1986 | Weaver | 524/71 |
| 4,741,868 | 5/1988 | Rooney et al. | 562/33 |
| 5,288,773 | 2/1994 | Gorbaty et al. | 524/59 |
| 5,336,705 | 8/1994 | Gorbaty et al. | 524/71 |
| 5,348,994 | 9/1994 | Gorbaty et al. | 524/71 |

*Primary Examiner*—Peter A. Szekely
*Attorney, Agent, or Firm*—Linda M. Scuorzo

[57] ABSTRACT

This invention provides for novel road paving binder compositions and the method of making them. One embodiment is a road paving binder composition of a storage stable blend of a sulfonated, unhydrogenated random copolymer of styrene and butadiene having a sulfonation level of from 1 to 100 meq SO$_3$H/100 g of polymer and a sulfonated asphalt. Another is a method of making a storage stable polymer modified asphalt composition by combining a sulfonated unhydrogenated random styrene butadiene copolymer having a sulfonation level of from about 1 to 100 meq SO$_3$H per 100 g of polymer and a sulfonated asphalt at a temperature of at least about 180° C. to produce a storage stable polymer modified asphalt. Yet another is a method of making a storage stable polymer modified asphalt by combining a sulfonated unhydrogenated random styrene and butadiene copolymer having a sulfonation level of from about 1 to 100 meq SO$_3$H/100 g of polymer, and unsulfonated asphalt and a basic neutralizing agent at a temperature of from about 170° C. to 185° C. to produce a storage stable polymer modified asphalt. Still another is a method for making a storage stable road paving composition by cosulfonation of a blend of unhydrogenated random styrene-butadiene copolymer and an asphalt at 180°–210° C. The novel road paving asphaltic compositions have enhanced viscoelasticity and storage stability. The compositions can be used as binders in road paving applications. Sulfonated copolymers of random styrene-isoprene may be substituted for the sulfonated copolymers of styrene-butadiene herein.

19 Claims, 2 Drawing Sheets

ROAD PAVING BINDERS

FIELD OF THE INVENTION

The present invention relates to storage stable road paving asphaltic compositions.

BACKGROUND OF THE INVENTION

Asphalt has certain physical properties that vary widely with changes in temperature. For this reason, polymers often are added to asphalt to extend the range of its physical properties. Polymers can reduce the tendency of the asphalt to creep and rut in warm weather by enhancing its high temperature viscoelastic properties; and polymers can minimize cracking and stripping in cold weather by improving the asphalt's low temperature viscoelastic properties.

Not all asphalts and polymers form compatible mixtures. Polymer modified asphalt's storage stability is greatly affected by the compatibility of the asphalt with the particular polymer. Incompatible and partially compatible mixtures undergo phase segregation.

Various method have been suggested for making polymer-modified asphaltic compositions that are sufficiently compatible to be acceptably storage stable and that also have the viscosities and softening points in the ranges required for a particular application.

U.S. Pat. No. 4,514,308 discloses a cosulfonated asphalt and a hydrogenated SBR for use as a well drilling mud. As such the composition requires a high level of sulfonation (about 55 wt. % in Example 1) to ensure dispersibility of the polymer modified asphalt composition in water. This characteristic is extremely undesirable in road paving compositions. The present invention specifically excludes hydrogenated versions of SBR.

U.S. Pat. No. 4,591,611 discloses a composition of 100 parts sulfonated polymers (SBR) and from 5 to 125 parts of gilsonite or conventional asphalt although it is stated in '611 that conventional asphalt does not work when substituted for gilsonite. Those compositions are significantly different from the novel compositions of the present invention, which contain only 2–3 parts polymer per 100 parts asphalt.

U.S. Pat. No. 5,348,994 discloses a road paving asphaltic composition containing storage stable base neutralized sulfonated polymer modified asphalt compositions and method of making them using the polymers butyl rubber, styrene-butadiene linear diblock, styrene-butadiene-styrene linear or radical triblock polymers and EPDM. The polymer is present in an amount of less than 7 wt. % and the resulting composition has a viscosity at 135° C. in the range of from about 150 cPs to about 2000 cPs or from about 3000 cPs to about 8000 cPs. The patent does not disclose the use of random styrene-butadiene or styrene-isoprene polymers.

SUMMARY OF THE INVENTION

The present invention relates to modified asphalt (PMA) compositions in which the copolymers are sulfonated unhydrogenated styrene-butadiene copolymer having a random monomer distribution ("random styrene butadiene" or "SBR") which are storage stable at high and low temperatures and have viscoelastic properties and softening points in ranges specified that make them particularly suitable for use as asphalt binders in dense graded and open graded road paving applications, specifically viscosities of from about 900 to 8000 cPs at 135° C. and softening points of at least about 45° C. This invention also relates to the method for making and using the sulfonated unhydrogenated styrene-butadiene random copolymer modified asphalt compositions, and includes the products produced by the processes disclosed herein.

Specifically the present invention provides for:

A storage stable road paving binder composition that is a storage stable blend of a sulfonated, unhydrogenated random copolymer of styrene and butadiene or styrene and isoprene having a sulfonation level of from 1 to 100 meq $SO_3H$/100 g of polymer and a sulfonated asphalt;

A storage stable road paving binder composition produced by (a) blending an asphalt and an unhydrogenated styrene-butadiene or styrene-isoprene random copolymer at sufficient temperature for a sufficient time to disperse the polymer in the asphalt; (b) maintaining the blend temperature of at least 180° C.; (c) adding a sulfonating agent in the amount of from 1–5 wt % based on the weight of the blend; and (d) purging the blend of step (c) with an unreactive gas at a temperature of at least about 180° C.;

A method of making a storage stable road paving binder composition by combining a sulfonated unhydrogenated random styrene-butadiene or styrene-isoprene copolymer having a sulfonation level of from about 10 to 30 meq $SO_3H$/100 g of polymer, and unsulfonated asphalt at a temperature of at least 170° C. to produce a storage stable road paving binder;

A method of making a storage stable road paving binder composition by combining a sulfonated asphalt and an unhydrogenated random styrene butadiene copolymer wherein the polymer has a sulfonation level of from about 10 to 30 meq $SO_3H$ per 100 g of polymer at a temperature of at least about 180° C. to produce a storage stable polymer modified asphalt;

A method of making a storage stable road paving binder composition, comprising (a) blending an asphalt and an unhydrogenated styrene-butadiene or styrene-isoprene random copolymer at sufficient temperature for a sufficient time to disperse the polymer in the asphalt; (b) maintaining the blend temperature of at least about 180° C.; (c) adding a sulfonating agent in the amount of from 1–5 wt % based on the weight of the blend; and (d) purging the blend of step (c) with an unreactive gas at a temperature of at least about 180° C.

Random copolymers of styrene and isoprene also may be used.

In addition to having utility as asphalt binders in dense graded and open graded road paving applications, particularly as a hot mix pavement binder, the compositions may be used in other applications known to one skilled in the art that require asphaltic compositions having the viscosities, softening points, and storage stability of the invention as described herein.

The present invention may suitably comprise, consist or consist essentially of the elements disclosed herein and may be practiced in the absence of an element not specifically disclosed.

DETAILED DESCRIPTION OF THE INVENTION

Figure 1:
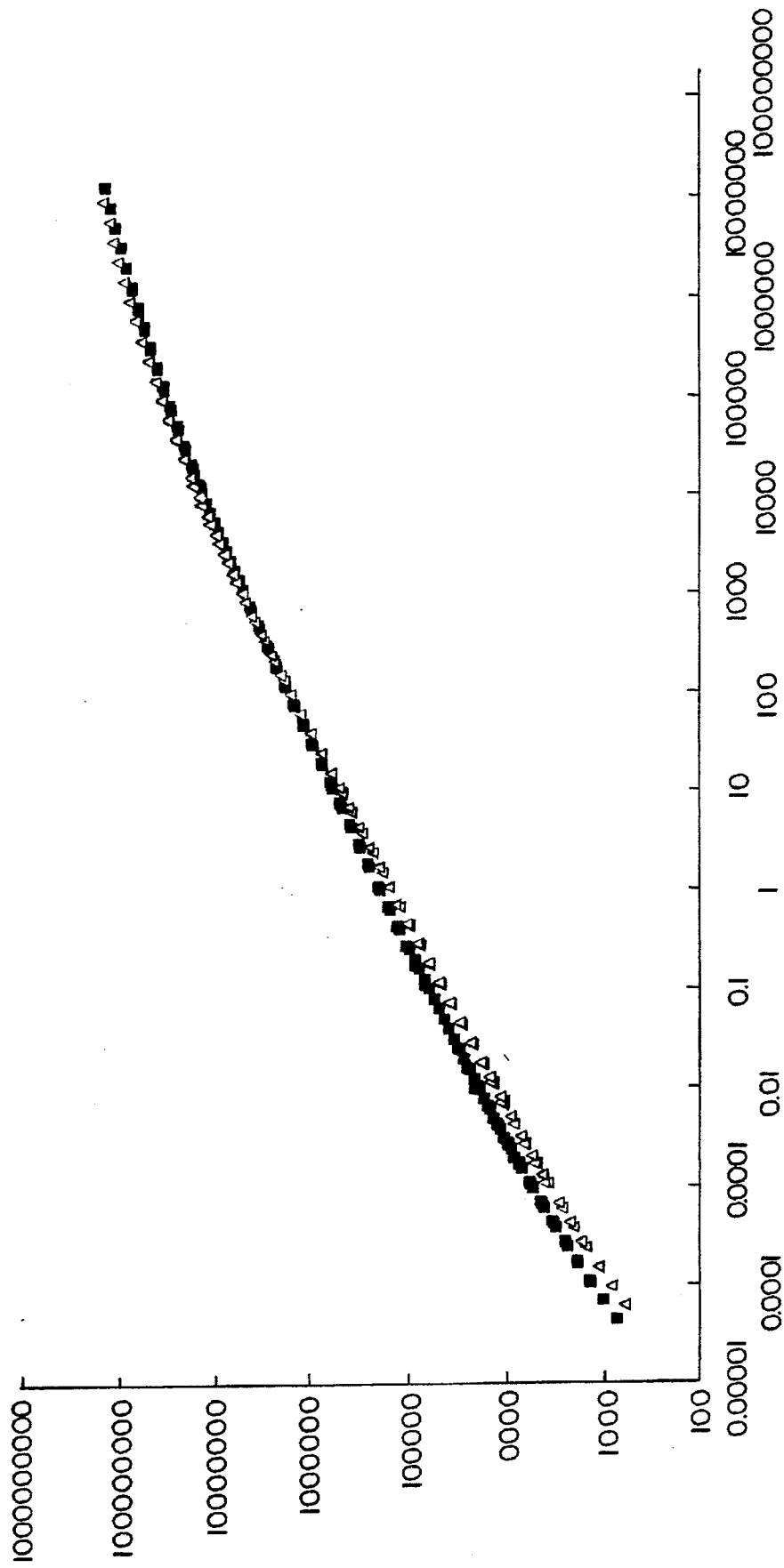
FIG. 1 shows the master curve at 25° C. of the dynamic complex shear modulus as a function of reduced frequency for two cosulfonated polymer modified asphalts. (PMAs).

The present invention uses random copolymers of sulfonated unhydrogenated styrene-butadiene as a component of polymer modified asphalts. The copolymers used herein have a random distribution of monomers, unlike the block copolymers used in the art and thus have different properties.

One embodiment of the present invention provides for polymer modified asphalt (PMA) compositions that are a blend of sulfonated asphalt and sulfonated unhydrogenated styrene-butadiene rubber (i.e., random) copolymers, optionally neutralized. Sulfonation may be accomplished using procedures known to those skilled in the art either for the asphalt and polymer individually or for the blend of asphalt and polymer. Asphalt sulfonation is from 10–30 meq per 100 g of asphalt. Optionally neutralization may be carried out, either on the blend of asphalt and polymer after sulfonation or on the sulfopolymer and sulfonated asphalt individually before blending. A second embodiment of the present invention is a blend of unsulfonated asphalt and sulfonated neutralized random SBR copolymer. In each instance sulfonation results in functionalization with sulfonic acid or sulfonate groups. All of the foregoing compositions exhibit the necessary softening points and enhanced viscoelastic/rheological properties, and compatibility between asphalt and polymer to make them suitable for use in road paving applications and materials. This compatibility between asphalt and polymer is manifested by enhanced storage stability. These compositions have a substantially uniform to uniform distribution of asphalt and polymer phases in the blend, which distribution does not segregate on standing at elevated temperatures, typically 160° C. Thus, in the present invention, it is essential that the polymer and asphalt phases do not phase segregate significantly on standing for a specified period of time (typically 3 to 5 days) into an asphalt phase and a polymer phase, but rather remain substantially uniformly dispersed in the blend on standing at the elevated temperatures at which paving binder compositions are typically produced and used or at which storage stability is measured (typically 160° C.).

Other embodiments of the present invention are the methods of making certain of the polymer modified asphalts disclosed herein. Applicants have discovered that blending of the asphalt and polymer must be carried out within specific temperature ranges in order to produce storage stable polymer modified asphalts having the requisite rheological properties.

Yet another embodiment of the present invention is the compositions produced by the processes disclosed herein.

The phase behavior of polymer modified asphalt blends is complex. A polymer modified asphalt blend may be one or two phases. One phase systems result when polymer is dissolved in asphalt. Many polymer asphalt blends form two phase systems ("phase separation"); one phase is mostly polymer and/or polymer swollen with asphalt, the other phase is mostly or entirely asphalt. Typically, one (a first) phase or the other (a second) phase is continuous. In one such case, discrete polymer particles are dispersed in asphalt, in another asphalt may be dispersed in polymer, in yet a third case both polymer and asphalt phases are continuous. As used herein, "phase segregation" and "segregation" mean that asphalt and polymer phases do not remain uniformly interdispersed top through bottom of the blend. This is demonstrated when the top and bottom thirds of a sample of the blend have different continuous phases; (e.g., the top continuous phase being polymer with or without asphalt interdispersed, and the bottom being asphalt with or without polymer interdispersed).

In the blends of the present invention, it is required that the asphalt and polymer remain dispersed throughout the blend, as measured by the softening points of samples taken of the top third and bottom third of a sample of the blend at the elevated temperature. Softening point variations of equal to or less than 4° C. (8° F.) indicate phase compatibility (i.e. insubstantial or no phase segregation) and, thus, a storage stable blend. The components of the stable polymer modified asphalts in the present invention are present in amounts that are effective to allow the formation of one continuous phase or two interdispersed phases that do not segregate on standing at the elevated temperatures. Phase separation, to the extent that it occurs, should be insubstantial and should not result in substantial physical segregation of the asphalt and polymer in the blend.

Generally, in a system or blend that is phase segregated, the system tends to form layers, such that the phase into which the polymer segregates shows a significantly higher softening point (i.e., above 4° C., 8° F.) than that of the asphalt phase (which is thus substantially depleted of polymer). However, small differences of softening points between the top and the bottom third of the sample of a blend do not always adequately define storage stability although this is a conventionally used measurement. A narrow temperature difference may exist and yet phase segregation (the essential antithesis of storage stability) may be present. For example, the top portion of the blend can have a continuous polymer phase with asphalt dispersed therein while the bottom portion has a continuous asphalt phase with polymer dispersed therein, even though the softening points are within the required range. Such a situation does not constitute storage stability in the present invention. Rather, the continuous phase of the polymer-modified asphalt at any point in the blend must be essentially the same. That is, for true storage stability the top portion of the blend will have the same continuous phase as the bottom portion. A storage stable blend in the present invention must satisfy two criteria, that of phase compatibility and of softening point variation, as follows: Phase compatibility occurs if asphalt is continuous top and bottom with polymer dispersed therein; or polymer is continuous top and bottom with asphalt dispersed therein, or both polymer and asphalt are continuous top and bottom with asphalt and polymer each dispersed in the other; and also wherein the softening point of a sample from the top third of the blend does not differ by more than 4° C.(8° F.) from the softening point measured of a sample from the bottom third of the blend.

Thus in the present invention, top and bottom samples of the storage stable blends contain: one continuous asphalt phase with polymer interdispersed, wherein the softening point temperature variation between top and bottom is less than or equal to about 4° C. Expressed otherwise, the variation must meet the formula (b-a)/(t-a) >0.7 to 1.0, preferably >0.8 to 1.0. As used herein, "a" is the softening point of the original starting asphalt (i.e., without polymer added), "b" is the softening point of the bottom sample and "t" is the softening point of the top sample. Softening points are typically measured by standard ring and ball tests which are readily known to those skilled in the art (as ASTM D36).

Optical micrographs were used in combination with softening point measurements as a measure of the substantial uniformity of distribution of asphalt and polymer phases, i.e., compatibility. Thus, if the top third and the bottom third of the sample stored at elevated temperature (typically 160° C.) for 4 to 5 days showed softening points within a 4° C.

(8° C.) variation and the micrographs indicated phase compatible (i.e., the asphalt and polymer were substantially uniformly distributed and showed insubstantial or no phase segregation on standing) the asphalt and polymer were judged to be compatible.

Sulfonations and neutralizations described herein are accomplished in an amount effective to maintain phase compatibility and to ensure that the asphalt and polymer do not phase segregate and to produce a polymer modified asphalt having the required softening point and rheological properties.

The starting materials used herein are available from commercial sources or may be synthesized as disclosed herein or using known procedures.

Asphalt is a bituminous material remaining after or prepared from the distillation of crude oil. The asphalts used in the present invention may be obtained from a variety of sources of vacuum residua and may be classified by their penetration grade (measured according to Standard Specification ASTM D-5). Typically, the asphalt will have a nominal atmospheric boiling point of at least 350° C. and more typically above 440° C. When used as an adhesive or binder component of road paving materials, asphalt is normally mixed with aggregate (i.e. rock), typically in a ratio of about 5 wt. % asphalt to 95 wt. % aggregate. In the present invention when the asphalt is to be sulfonated separately from the polymer oleum or sulfuric acid typically are used as the sulfonating agents and are added in stoichiometric amounts to the asphalts, as known in the art.

When the SBR polymers described herein are to be sulfonated separately from the asphalt this may be performed by means such as dissolution in a nonreactive solvent, followed by addition of a sulfonating agent at temperatures normally from −100° C. to +100° C. as known to those skilled in the art. The sulfonating agents may be any suitable sulfonating agents, such as oleum or sulfuric acid, and acyl sulfates. Such processes are well known to those skilled in the art.

For polymer modified asphaltic compositions of the present invention that contain a sulfonated asphalt and sulfonated polymer, they may be prepared by sulfonation of the individual components or by direct sulfonation (i.e., cosulfonation) of the unsulfonated mixture of asphalt and polymer as specified herein.

The sulfonated polymers as prepared contain typically from 1 to 100 meq $SO_3H/100$ g polymer, preferably from about 3 to 60 meq $SO_3H/100g$ polymer, most preferably from 15 to 30 meq $SO_3H/100$ g of polymer. For cosulfonation, the sulfonating agent is used in weight ratios of from 1 to 5 wt %., preferably from 1 to 3 wt. % of total asphaltic composition. The final properties desired in the polymer modified asphalt composition will influence the choice of sulfonation levels within the disclosed ranges.

In the polymer modified asphaltic compositions prepared by the cosulfonation procedure in the present invention, the polymer to be added to the asphalt is desirably in the form of a latex (i.e., a liquid consisting of polymer dispersed in water) with a minimum of 50 wt %, preferably 70 wt % of polymer. Use of a latex is advantageous in reducing the problems associated with handling the polymer in solid form (e.g., as powder, pellets or crumbs).

The asphalt and polymer are combined to produce a mixture or blend. Stirring, mixing or agitation, using a high shear mixing device are suitable blending methods. The method used will influence the amount of time needed to combine the asphalt and polymer but in any event should be sufficient to distribute the polymer throughout the asphalt. Times may range from 0.5 to 24 hours, according to the method selected.

Further, Applicants have unexpectedly found that to produce storage stable polymer modified asphalt having the required viscosities and softening points by cosulfonation of a blend of unsulfonated polymer and unsulfonated asphalt, the sulfonation and optional neutralization must be carried out at temperatures of at least about 180° C., preferably 190° C. to 210° C. In addition, the viscosities of the compositions obtained by the cosulfonation procedure were unexpectedly higher than those made by the same procedure except using a radial SBS in comparision.

For blends of sulfonated polymer in unsulfonated or sulfonated asphalt, Applicants unexpectedly have discovered that the temperature of blending or mixing is important to produce storage stable blends having the desired rheological properties for use as a binder in road paving applications. To produce a storage stable polymer modified asphalt having the required viscosities and softening points from a sulfonated asphalt and sulfonated polymer, the materials must be blended at temperatures of at least about 180° C., preferably 190° C. to 210° C. To produce storage stable polymer modified asphalt having the required viscosities and softening points from an unsulfonated asphalt and sulfonated polymer, the materials must be blended at a temperature of at least 170° C., preferably 170° C. to 185° C.

When neutralization is carried out on the sulfonated polymer or sulfonated asphalt individually, or on the cosulfonated asphalt polymer blend a basic neutralizing agent is used that contains cations having a valence from +1 to +3. These are selected from the group consisting of ammonia, amines and bases that contain cations selected from Groups, IA, IIA, IIIA and Groups IB through VIIB of the Periodic Table and mixtures thereof. A preferred basic neutralizing agent is one that contains one or more monovalent or divalent, preferably divalent cations, more preferably $Zn^{+2}$, $Ba^{+2}$, $Ca^{+2}$, $Mg^{+2}$ and mixtures thereof, most preferably $Zn^{+2}$ and $Ca^{+2}$. Suitable compounds containing such cations are, for example, zinc acetate, zinc oxide or calcium oxide, more preferably calcium oxide. The neutralizing agent may be contained in a suitable solvent such as water/methanol, or may be added in situ (i.e., directly without diluent), for example in powdered or other undissolved form. The latter is preferable particularly when the neutralizing agent is to be added directly to heated co-sulfonated asphalt polymer mixtures or heated sulfonated asphalt. When used, sufficient neutralizing agent must be added to neutralize the acid functionality. Neutralization of the sulfonated random SBR polymer is required before blending with unsulfonated or sulfonated asphalt to produce storage stable binders having the desired rheological properties. However, Applicants also have found that neutralization of the sulfonated asphalt is optional for blends of sulfonated asphalt with sulfonated random SBR and is also optional for the products made by cosulfonation, in order to produce storage stable binders having the desired rheological properties.

Softening points in the range of at least about 45° C., preferably greater than about 55° C. to about 65° C. as a binder for dense graded, and preferably from about 60° C. to about 75° C. as a binder for open graded pavement, are desired.

The weight percent of random SBR polymer in the polymer modified asphalt composition should be an effective amount based on the desired physical properties of the resulting road paving asphaltic binder composition and may be any suitable amount greater than zero sufficient to achieve these properties. The amount of polymer by weight percent of total composition should be sufficient to maintain the viscosity of the composition in a range from about 900 to about 8000 cPs measured at 135° C. This amount can range from greater than zero to about 7 wt. % preferably, more preferably 2 to 7 wt. % and most preferably from about 2 to 5 wt. % that is sufficient to achieve the desired physical properties. The upper limit within the range is often constrained by the cost of the polymer added, as well as by physical properties of the product.

Sulfonated random copolymers of styrene and isoprene also may be substituted for the sulfonated random styrene and butadiene copolymers herein with comparable results.

It is possible to adjust the softening point and viscosity of the road paving asphaltic composition by varying the amount of sulfonation of the asphalt and/or amount of sulfonated polymer in the composition within the disclosed ranges. Similar control is possible in the products made by cosulfonation by varying the amount of sulfonation of the asphalt-SBR blend and the amount of SBR polymer in the starting blend within the disclosed ranges. The physical properties of the resulting composition will vary accordingly within the range. In addition, if necessary in order to bring the viscosity of the mixture into the range acceptable for the particular application, flux (e.g., original asphalt) may be added to the asphaltic composition. The amount of flux to be added will depend on the viscosity of the starting materials and the desired viscosity of the end product and the particular application and is readily determinable by one routinely skilled in the art in view of the teachings herein.

The novel binders of the present invention may be combined with aggregate or rock to form superior paving compositions having improved properties. Aggregate is known to those skilled in the art and suitably is any particulate material used in road paving applications for combination with binder. Any suitable material, typically, locally available materials may be used; e.g., rock, stone granite, shells or other suitable high modulus material. This is accomplished by forming the binder according to the methods disclosed above to have the required characteristics of phase compatibility and, thus, storage stability, softening point and viscoelastic properties described above, and mixing the binder with aggregate or rock to form the road paving composition. The paving material may be applied to a paving surface according to methods and under conditions known to those skilled in the art to be effective to produce a road paving surface.

The invention is illustrated by the following examples, which are not intended to limit the scope of the invention.

EXAMPLE 1

This example illustrates the synthesis of sulfonated styrene-butadiene random copolymer.

Two hundred grams of a styrene-butadiene copolymer having a random monomer distribution (Goodyear SBR 1502, manufactured by Goodyear Corporation) was dissolved in 1529 ml of cyclohexane. After copolymer dissolution, a pre-blended sulfonating agent made from 10.8 ml of propionic anhydride and 2.8 ml of sulfuric acid dissolved in 200 ml of methylene chloride were added slowly. During the entire addition procedure, vigorous agitation was maintained. The addition took approximately 45 minutes to complete. The mixture was further agitated for about 30 minutes. The viscosity of the solution increased.

Neutralization was accomplished by addition of a clear mixture of 108 ml of methanol, 6 ml of distilled water and 36 g of zinc acetate, again using vigorous stirring conditions. After addition of the neutralizing agent, the solution was further agitated for one hour. The sulfonated and zinc neutralized styrene-butadiene random copolymer was isolated by stream stripping, i.e. slowly pouring the neutralized sulfonated copolymer into a bath of boiling water through which steam was continuously passed. The isolated copolymer was subsequently washed with a large excess of distilled water and permitted to dry in air for approximately 12 hours. The copolymer was further dried at 60° C. in a vacuum oven for 24 hours. The sulfur content was determined by the Dietert sulfur analysis method to have a sulfur content of 0.44 wt. %. The sulfonation level calculated from this value was 13.75 meq/100 g polymer.

EXAMPLE 2

This example illustrates a procedure for blending of a sulfonated SBR with unsulfonated asphalt.

The unsulfonated asphalt was heated to a temperature of 170° C. The polymer crumb was added as small pieces over a 30–45 minute period. The blend was then mixed for 2 hours using a high shear blender, after which the product was collected and its properties determined. Storage stability was determined by placing about 40 g of the product in a tube and allowing it to stand at 160° C. for 4 days. Softening points were determined for the top and bottom thirds of the stored sample and micrographs taken. A sample was judged to be storage stable if the difference between the softening points of the top and bottom thirds of the sample was no more than 4° C.(8° F.). The comparison in Table 1 below shows that the unsulfonated SBR did not form storage stable blends with unsulfonated asphalt while the sulfonated and neutralized SBR derivative did.

TABLE 1

| | FEED: Cold Lake 300/400, unsulfonated asphalt | | | | |
|---|---|---|---|---|---|
| Polymer | Polymer Sulfonation | Softening points, °F. (°C.) | | | Viscosity |
| (Wt %) | (meq/100 g) | Initial | Top | Bottom | cPs, 135° C. |
| SBR1502(3) | 0 | 110(43) | 114(46) | 106(41) | — |
| Zn-Sulfo-SBR(3) | 13.75 | 103(39) | 105(41) | 105(41) | 506 |
| Zn-Sulfo-SBS(3) | 12.75 | 123(51) | 129(54) | 129(54) | 634 |

EXAMPLE 3

The general procedure for co-sulfonation follows. The asphalt was heated to a temperature of 190° C. and SBR was added by pouring the appropriate amount of 70% SBR latex (corresponding to the amount of polymer desired) into the hot asphalt with low shear stirring. Sulfonating agent was then added over a 45 minute period, and the mixture stirred for 1 hour after which neutralizing agent was added.

The following is an example of the procedure for co-sulfonation: Cold Lake 300/400 penetration grade asphalt (369.4 g) was heated to 190° C. and stirred for 15 minutes to equilibrate at that temperature. With continued stirring 10.56 g of a 70% by weight SBR latex, Ultrapave, (7.39 g SBR) was poured into the asphalt. Nitrogen was fed through a tube inserted below the liquid surface to aid in water removal. The sulfonating agent, made from 4.14 ml of concentrated sulfuric acid and 4.14 ml of water, was added dropwise over a 40 minute period without nitrogen sparging. The mixture was allowed to stir for an additional 60 minutes without sparging after which time 2.11 g of calcium oxide was added. The mixture was stirred for 30 minutes, the sparger reattached, and stirring continued for an additional 90 minutes. 374.8 g of the product were recovered by pouring from the flask.

Table 2 below contains data on a number of polymer modified asphalts made by this procedure. Note also that the run with 2 wt % polymer but no sulfonation gave a product that was not storage stable.

Table 2 also shows that PMAs made with 2% SBR had significantly higher viscosities than those made from 3% SBS radial triblock copolymers at equivalent sulfonation levels. Based on the results in Table 1, it was unexpected that the SBR polymer would have better properties (as evidenced by the successful use of lower polymer levels).

TABLE 3

| Wt % SRB Polymer | Sulfonation (meq/ 100 g) | Softening Point °F. (°C.) | | | Viscosity cPs; 135° C. |
|---|---|---|---|---|---|
| | | Initial | Top | Bottom | |
| 2 | 13 | 128(53) | 157(69) | 121(49) | 506 |
| 2 | 26 | 152(67) | 162(72) | 145(63) | 3155 |
| 2 | 26 | 151(66) | 158(70) | 146(63) | 3025 |

EXAMPLE 5

This example demonstrates that a cosulfonated polymer modified asphalt made with 2 wt %. random SBR latex copolymer had comparable rheological properties to a polymer modified asphalt made From 3 wt. % radial SBS.

Figure 2:
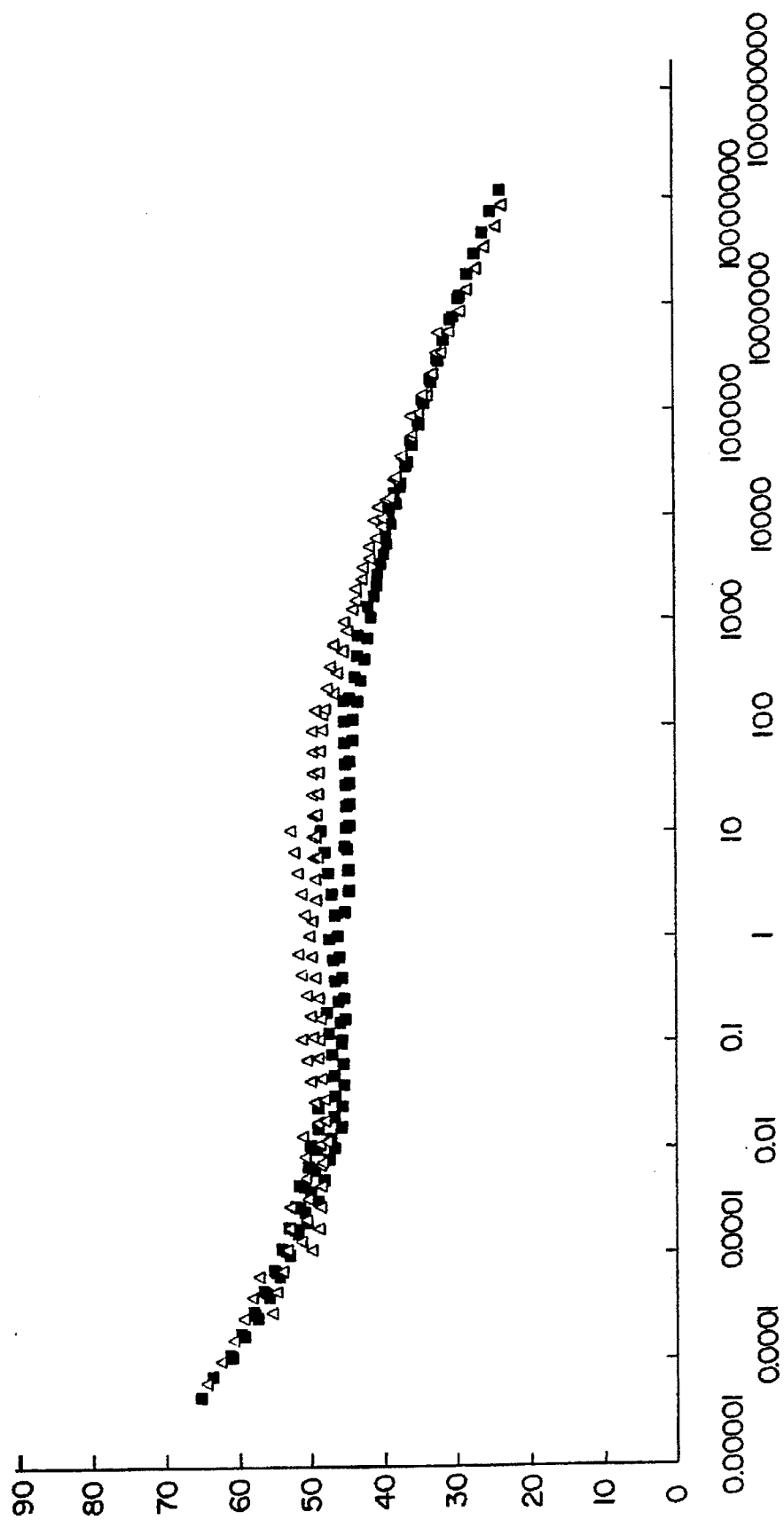
FIG. 2 shows the master curve at 25° C. of the phase angle as a function of reduced frequency for the two cosulfonated PMAs.

FIG. 1 shows the master curve at 25° C. of the dynamic complex shear modulus (Pa) as a function of reduced frequency (in rad/sec.) For the two cosulfonated PMAs aged by Rolling Thin Film Oven Tests. *The rheological properties of the cosulfonated PMA with 2 wt. % SBR latex indicated by darkened boxes and the cosulfonated PMA with 3% radial SBS indicated by open triangles were similar throughout the frequency/temperature domain studied. In the high temperature/low frequency domain, a higher modulus was observed for the 2% SBR blend, indicative of higher resistance to creep. FIG. 2 shows the master curve at 25° C. of the phase angle, illustrating the PMA elasticity, as a

TABLE 2

Sulfonating Agent: 50% aq $H_2SO_4$
Neutralizing Agent: CaO
Temperature: 190° C.
FEED: Cold Lake 300/400

| (Wt %) Polymer | Sulfonation Level (meq/100 g) | Softening Points, °F.(°C.) | | | Viscosity cPs, 135° C. |
|---|---|---|---|---|---|
| | | Initial | Top | Bottom | |
| (0) | 0 | 90(32) | — | — | 250 |
| (2) SBR latex | 0 | 115(46) | 129(54) | 109(43) | 503 |
| (2) SBR latex | 20 | 146(63) | 148(64) | 148(64) | 2905 |
| (2) SBR latex | 26 | 157(69) | 154(68) | 150(66) | 4165 |
| (2) SBR latex | 26 | 145(63) | 152(63) | 146(63) | 2735 |
| (2) SBR (radial triblock) | 20 | 140(60) | 145(63) | 142(61) | 1190 |
| (3) SBR solid crumb | 0 | 110(43) | 114(46) | 106(41) | — |
| (3) SBR solid crumb | 26 | 159(71) | 154(68) | 154(68) | 5570 |
| (3) SBR as latex | 20 | 156(69) | 167(75) | 159(71) | 6400 |
| (3) SBR as latex | 26 | 167(75) | 166(74) | 161(72) | 12140 |
| (3) SBR radial triblock | 20 | 145(63) | 157(67) | 152(67) | 1280 |
| (3) SBS radial triblock | 26 | 149(65) | 155(68) | 152(67) | 1614 |
| (1.5) SBR latex and 1.5 SBS radial triblock | 20 | 156(69) | 163(73) | 157(69) | 3455 |
| FEED: Billings 120/150 | | | | | |
| (2) SBR latex | 20 | 178(81) | 169(76) | 161(72) | 8500 |
| (3) SBS radial triblock | 26 | 169(76) | 158(70) | 157(69) | 5890 |
| FEED: Baytown AC5 | | | | | |
| (2) SBR latex | 20 | 127(53) | 129(54) | 129(54) | 1014 |
| (2) SBS radial triblock | 20 | 123(51) | 127(53) | 126(52) | 680 |

EXAMPLE 4

This example demonstrates the criticality of temperature in cosulfonated blends. In Table 3 below data for materials prepared by cosulfonation at 160° C show that none of the products were storage stable even though the amounts of polymer and sulfonating agents were the same as for similar examples in Table 2, but prepared at 190° C.

function of reduced frequency for the two cosulfonated PMAs, aged by the Rolling Thin Film Oven Tests. The elasticity level of the 2% SBR latex blend was comparable to or higher at intermediate frequencies than the elasticity level for the 3 wt % radial SBS blend.

What is claimed is:

1. A road paving binder composition, comprising: a storage stable blend of a sulfonated, unhydrogenated random copolymer selected from the group consisting of styrene butadiene copolymers and styrene isoprene copolymers having a sulfonation level of from 1 to 100 meq $SO_3H$/100 g of polymer and a sulfonated asphalt.

2. The composition of claim 1 wherein the blend is base neutralized.

3. The composition of claim 2 wherein the polymer is base-neutralized.

4. The composition of claim 1 wherein the blend has a viscosity of from about 900 to 8000 cPs at 135° C. and a softening point of at least about 45° C.

5. The composition of claim 1 wherein the sulfonated asphalt is produced by sulfonating an unsulfonated asphalt with from 0.1 to 5 wt % of sulfonating agent based on the weight of the starting asphalt.

6. A method of making a storage stable road paving binder composition, comprising: combining a sulfonated asphalt and an unhydrogenated random copolymer selected from the group consisting of styrene butadiene copolymers and styrene isoprene copolymers wherein the polymer has a sulfonation level of from about 10 to 30 meq $SO_3H$ per 100 g of polymer at a temperature of at least about 180° C. to produce a storage stable polymer modified asphalt.

7. The method of claim 6 wherein the temperature is from 190° C. to 210° C.

8. A road paving binder composition, comprising: a storage stable blend of a sulfonated unhydrogenated random copolymer selected from the group consisting of styrene butadiene copolymers and styrene isoprene copolymers having a sulfonation level of from about 1 to about 100 meq $SO_3H$/100g polymer and an unsulfonated asphalt.

9. The composition of claim 8 wherein the blend is base-neutralized.

10. A method of making a storage stable road paving binder composition comprising: combining a sulfonated unhydrogenated random copolymer selected from the group consisting of styrene butadiene copolymers and styrene isoprene copolymers having a sulfonation level of from about 10 to 30 meq $SO_3H$/100 g of polymer, and unsulfonated asphalt at a temperature of at least 170° C. to produce a storage stable road paving binder.

11. The method of claim 10 wherein the temperature is from 170° C. to 1850° C.

12. A storage stable road paving binder composition produced by the process of (a) blending an asphalt and an unhydrogenated random copolymer selected from the group consisting of styrene butadiene copolymers and styrene isoprene copolymers at sufficient temperature for a sufficient time to disperse the polymer in the asphalt; (b) maintaining the blend temperature of at least 180° C.; (c) adding a sulfonating agent in the amount of from 1 to 5 wt % based on the weight of the blend; and (d) purging the blend of step (c) with an unreactive gas at a temperature of at least about: 180° C.

13. The composition of claim 12, further comprising neutralizing the blend of step (c).

14. The composition of claim 12 wherein the temperature in steps (b) and (d) is from about 190° C. to 210° C.

15. The composition of claim 12 wherein the copolymer is added to the asphalt in the form of a latex containing at least 50 wt % polymer.

16. The composition of claim 12 wherein the blend has a viscosity of from about 900 to 8000 cPs at 135° C. and a softening point of at least 45° C.

17. A method of making a storage stable road paving binder composition, comprising: (a) blending an asphalt and an unhydrogenated random copolymer selected from the group consisting of styrene butadiene copolymers and styrene isoprene copolymers at sufficient temperature for a sufficient time to disperse the polymer in the asphalt; (b) maintaining the blend temperature of at least 180° C.; (c) adding a sulfonating agent in the amount of from 1 to 5 wt % based on the weight of the blend; and (d) purging the blend of step (c) with an unreactive gas at least about 180° C.

18. The method of claim 15 wherein the product of step (c) is neutralized.

19. The method of claim 16 wherein the temperature is from about 190° C. to 210° C.

* * * * *

UNITED STATES PATENT AND TRADEMARK OFFICE
CERTIFICATE OF CORRECTION

PATENT NO. : 5,627,225  Page 1 of 1
DATED : May 6, 1997
INVENTOR(S) : Martin L. Gorbaty et al.

It is certified that error appears in the above-identified patent and that said Letters Patent is hereby corrected as shown below:

<u>Column 12,</u>
Lines 1 and 2, claim 11 should read
11. The method of Claim 10 wherein the temperature is from 170ºC. to 185ºC.

Signed and Sealed this

Sixteenth Day of March, 2004

JON W. DUDAS
*Acting Director of the United States Patent and Trademark Office*